MAGNETORESISTIVE FREQUENCY DOUBLER

Filed June 16, 1964 2 Sheets-Sheet 1

INVENTORS
PAUL E. OBERG
RICHARD M. SANDERS
CHARLES H. TOLMAN
BY Thomas J. Nikolai
ATTORNEY INVENTORS
PAUL E. OBERG
RICHARD M. SANDERS
CHARLES H. TOLMAN
BY Thomas J. Nikolai
ATTORNEY United States Patent Office 3,353,086
Patented Nov. 14, 1967

3,353,086
MAGNETORESISTIVE FREQUENCY DOUBLER

Paul Oberg, Minneapolis, Richard M. Sanders, St. Paul, and Charles H. Tolman, Bloomington, Minn., assignors to Sperry Rand Corporation, New York, N.Y., a corporation of Delaware Filed June 16, 1964, Ser. No. 375,482
7 Claims. (Cl. 321—60)

ABSTRACT OF THE DISCLOSURE

A frequency doubler including a plurality of series connected thin magnetic films each having a magnetic vector that is continuously rotated whereby the resistance of the film is changed to produce an output signal that has a frequency twice that of the drive frequency, $f_0$, which is rotating the magnetic vector. By using the output of one film to drive another, $n$ film elements will produce an output frequency of $2^n f_0$.

*Background of the invention*

It is old and well known that the electrical resistivities of iron and nickel change when they are magnetized. See Bozorth, Ferromagnetism, Chapter 16, "Magnetism and Electrical Properties," page 745, D. Van Nostrand Company, Inc., Princeton, N.J., Fourth Printing, 1956. This change in resistivity resulting from the application of a magnetic field to the material in question is known as "magnetoresistance" and the resistance is found to be a maximum when the angle between the resistance measurement sense line and the magnetization vector is zero and is a minimum when the angle is 90°.

This magnetoresistive effect extends also to magnetic thin films. A magnetic thin film is generally defined as a ferromagnetic element having single domain properties. The term "single domain property" may be considered the characteristic of a three-dimensional element of magnetic material having a thin dimension which is substantially less than the width and length thereof wherein no domain walls can exist parallel to the large surface of the element.

These films may possess either of the characteristics known as isotropy or uniaxial anisotropy. In the second case, uniaxial anisotropy, the remanent magnetic vector rests in one or the other direction along a preferred axis otherwise known as the easy axis of the film. An isotropic ferromagnetic film does not have a preferred or easy axis. In whatever direction the magnetic vector may be placed, it will rest equally well.

In the preferred embodiment of this case, the magnetic thin film as defined above possesses the characteristic of isotropy wherein it does not have a preferred or easy axis but rather, the remanent magnetic vector will rest in any desired direction.

If a magnetic field is applied to a magnetic thin film in a direction non-parallel to the direction of the film magnetization vector, the vector will rotate. The direction of rotation will depend upon the direction of the applied magnetic field.

If a current is passed through the ferromagnetic thin film by means of electrical leads physically attached to the film and 180° apart, the current will change in magnitude when a magnetic field is applied to the film non-parallel to the magnetization vector because the resistance of the film will change as the magnetization vector rotates. The electrical leads physically attached to the film are called "sense lines" or "resistance measuring sense lines."

The electrical resistance of the magnetic film, then, depends on the space angle between the resistance measuring sense line connected to the film and the film magnetization vector. As explained above, this resistance has been found to be a maximum when the sense line connected to the film and the film magnetization vector are parallel or antiparallel and a minimum when the sense line and the magnetization vector are perpendicular to each other.

*Summary of the invention*

The present invention discloses improved apparatus for doubling the frequency of a sinusoidal signal by using the change in resistance of a ferromagnetic thin film. By applying input sinusoidal signals 90° apart in phase to two strip or drive lines which are inductively coupled to the thin film, a rotating magnetic field of constant strength is produced which also rotates the magnetic vector of the film. It is old and well known that a plot of two sinusoidal waves 90° apart in phase results in a circle representing the resultant. As this rotating magnetic vector passes through points parallel to and perpendicular to the sense line, the resistance, and thus the current through and voltage drop across the film, changes in magnitude. For one complete rotation of the magnetic vector, two points of maximum resistance and two points of minimum resistance will occur. Thus the output, which may be detected in the form of a voltage change across the film element or a current change through the element, will have a frequency that is twice the drive frequency.

It is therefore an object of the present invention to provide a frequency doubler using magnetic thin films.

It is a further object of this invention to provide a frequency doubler by applying two signals with a 90° phase difference to two strip lines adjacent a magnetic film element.

It is also an object of this invention to provide a frequency doubler which utilizes thin film fabrication capable of microminiaturization and which would be compatible with other devices fabricated in the same process.

The phase angle between the input and output signals depends only upon the position of the sense lines with respect to the drive lines.

Thus, it is another object of this invention to provide a frequency doubler the output of which may be obtained at any phase angle with respect to the input.

It is also an object of this invention to provide frequency doubling without distortion over a wide range of frequencies.

*Brief description of the drawing*

For a more complete understanding of the invention these and other more detailed and specific objects will be disclosed in the course of the following specification, reference being had to the accompanying drawings, in which.

*Description of the preferred embodiments*

The numerals indicate like elements in the various figures of the drawings.

The phenomenon of magnetoresistance in magnetic elements displaying single-domain properties can be described as a rotation of the magnetization vector causing a change in the electrical resistance of the material. The application of a magnetic field or the application of a stress to a magnetostrictive film element will, in general, cause a rotation of the magnetization. It has been established (see Bozorth, supra, page 754) that the ohmic resistance R of a film can be expressed by the equation:

$$R=(R_0-R_1)\cos^2\theta+R_1 \tag{1}$$

where $R_0$ and $R_1$ are constants of the magnetic material, $R_0$ being the maximum resistance of the element and $R_1$ being the minimum resistance of the element. The angle $\theta$ is the angle between the magnetization of the thin film element and the resistance measurement sense lines.

As can be seen from Equation 1, when the magnetization is parallel or antiparallel to the direction of resistance measurement so that $\theta=0°$ or $180°$, Equation 1 reduces to $$R=R_0 \tag{2}$$

and the resistance is a maximum. However, when the magnetization is perpendicular to the direction of resistance measurement and, thus, $\theta=90°$ or $270°$, Equation 1 reduces to $$R=R_1 \tag{3}$$

and the resistance is a minimum.

Figure 1:
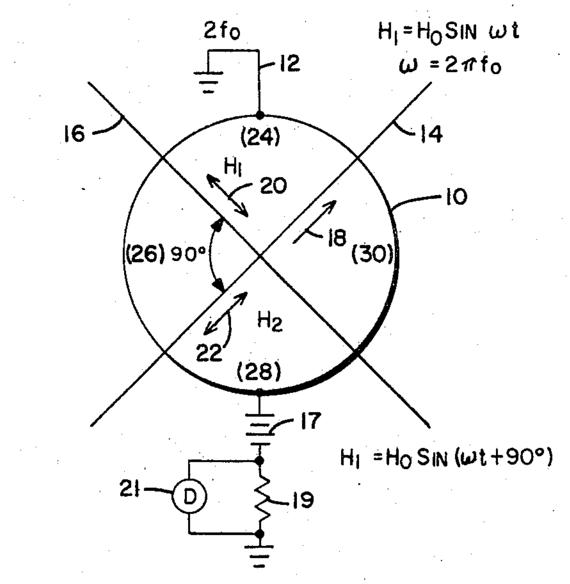
FIG. 1 shows a general representation of a thin film used in this invention with the sense and drive lines attached.

Referring now to FIG. 1, there may be seen a ferromagnetic thin film 10 to which is attached a resistance measurement sense line 12. The film 10 does not have an easy or preferred axis of magnetization since it is isotropic but assume that its magnetication vector 18 is initially oriented parallel to drive line 14 in the direction shown. Now assume that a sinusoidal drive current $i_1$, is applied to drive line 14 which will produce a magnetic field $$\vec{H}_1$$

as shown by vector 20 and of the magnitude $$H_1=H_0\sin\omega t \tag{4}$$

where $H_0$ is the maximum amplitude of the magnetic field, $\omega=2\pi f_0$ and $f_0$ is the frequency of the applied current $i_1$. Assume that the current is initially applied to line 14 in such a direction as to cause a magnetic field which will rotate the film magnetization vector 18 in a counterclockwise direction. Of course, when the sinusoidal current reverses, the direction of this field will reverse.

Assume also that a second sinusoidal current $i_2$ is applied to drive line 16 which will produce a second magnetic field $$\vec{H}_2$$

as shown by vector 22 and of the magnitude $$H_2=H_0\sin(\omega t+90°)=H_0\cos\omega t \tag{5}$$

where $H_0$ is the maximum amplitude of the magnetic field, $\omega=2\pi f_0$ and $f_0$ is the frequency of the applied current $i_2$. It is to be noted that the signal frequency of drive current $i_2$ is 90° out of phase with the signal frequency of drive current $i_1$.

Under steady-state conditions, as drive current $i_1$, and thus magnetic field $$\vec{H}_1$$

build up to a maximum, magnetization vector 18 rotates counterclockwise into quadrant 24. When $$\vec{H}_1$$

is a maximum, $$\vec{H}_2$$

is zero. As $$\vec{H}_1$$

begins to decrease, $$\vec{H}_2$$

begins to increase from zero. If $$\vec{H}_2$$

is increasing in the proper direction, it will assist the decreasing field $$\vec{H}_1$$

in rotating vector 18 counterclockwise through quadrant 24 to quadrant 26. When $$\vec{H}_2$$

is a maximum, $$\vec{H}_1$$

will be zero and as $$\vec{H}_2$$

begins to decrease, $$\vec{H}_1$$

will reverse direction since the sinusoidal drive current $i_1$ begins to reverse. But since vector 18 is now in quadrant 26 the reversed $$\vec{H}_1$$

will continue to rotate vector 18 counterclockwise into quadrant 28. When $$\vec{H}_1$$

passes through zero and decreases to its minimum value, $$\vec{H}_2$$

will be decreasing to zero and, since vector 18 is now in quadrant 28, $$\vec{H}_2$$

will continue to rotate it from quadrant 28 to quadrant 30. In quadrant 30, $$\vec{H}_1$$

will have reversed directions $$\vec{H}_2$$

will have decreased from zero and continues to rotate vector 18 counterclockwise. It is seen, then, that the application of two sinusoidal drive currents phased 90° apart to the drive lines 14 and 16 will cause the film magnetization vector to rotate. It can further be seen that the rotation could be either clockwise or counterclockwise depending upon the direction and phase relationship of the applied fields. The rotating magnetization vector changes the resistance of the film which changes the current flow through the film from source 17. This changing current develops a voltage across resistor 19 which has a frequency $2f_0$. This voltage may be detected by any suitable detector 21 such as an oscilloscope, frequency meter, etc.

Thus, it can be seen that the input signal on any one of the drive lines is a function of time and can be expressed by the equation $$H=H_0\sin\omega t \tag{6}$$

with a frequency $f_0=\omega/2\pi$.

The output signal is proportional to the resistance change, which, as expressed in Bozorth, supra, is a function of the angular displacement $\theta$ between the film magnetization vector and the sense line and expressed mathematically as $$R=(R_0-R_1\ \mathrm{Cos}^2\theta+R_1 \tag{7}$$

Through the use of the identity $$\cos^2 \theta = \tfrac{1}{2} (\cos 2\theta +) \quad (8)$$

the above Equation 7 can be changed to $$R = \tfrac{1}{2} (R_0 - R_1) \cos 2\theta + C \quad (9)$$

Under steady state conditions, $\theta$ can be related to the angular frequency of the rotation of the magnetization vector by the equation $$\theta = \omega t \quad (10)$$

and Equation 9 becomes $$R = B \cos 2\omega t + C \quad (11)$$

where B and C are constants of the magnetic material. Since the input signal is varying at a rate of $\omega$ and the output signal is varying at the rate of $2\omega$, the output signal has a frequency $$f = 2f_0 \quad (12)$$

This demonstrates the frequency doubling behavior, frequency $f_0$ in and $2f_0$ out, with no distortion.

Figure 2:
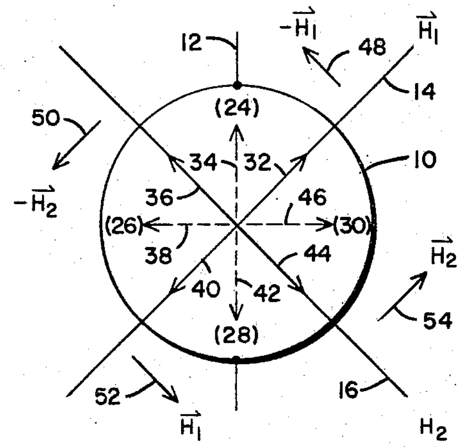
FIG. 2 shows the effect of the applied orthogonal fields upon the film magnetization vector.
Figure 3:
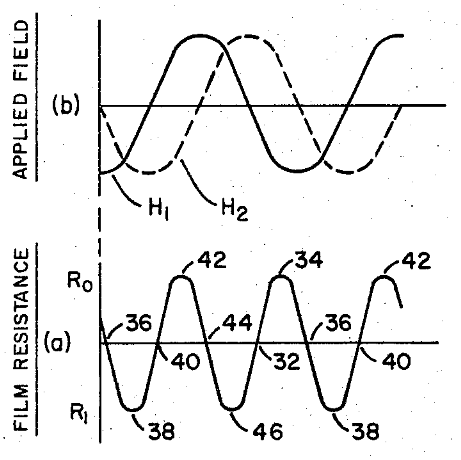
FIG. 3 shows the corresponding change in film resistance caused by the application of the orthogonal fields shown in FIG. 2.

FIG. 2 shows a magnetic thin film 10 with sense line 12 attached and drive lines 14 and 16 at 90° to each other and removed 45°, for example, from the sense line 12. Assume the magnetization vector 18 to be initially parallel to drive line 14 in the direction shown by vector 32. The resistance of the film at this time is halfway between maximum and minimum. Assume now that the current in drive line 14 has produced a field $$\vec{H}_1$$

which is maximum in the negative direction as shown by vector 48 in FIG. 2 and by the curve denoted $$\vec{H}_1$$

in FIG. 3(*b*). Under steady-state conditions, the magnetic vector 18 will be rotated CCW to position 36. However, since the system is dynamic and the fields are constantly changing, the magnetic vector 18 lags the applied magnetic field. As shown in FIGURE 3, when the magnetic field $$\vec{H}_1$$

is maximum in the negative direction, the vector 18 is not at position 36 but slightly lagging. Thus, vector 18 is following the rotating resultant magnetic field and lagging slightly behind it. When vector 18 is in position 34, the resistance of the film is a maximum since the magnetization vector 18 and the sense line 12 are parallel. As shown in FIG. 3(*b*), when $$\vec{H}_1$$

is negative and decreasing toward zero, $$\vec{H}_2$$

will be negative and increasing toward a maximum negative value and the two fields move the vector 18 CCW past position 36 into quadrant 26. As shown in FIG. 3(*a*) the resistance of the film will change from the median value at position 32 to a maximum value at position 34 and to a median value at position 36. As the ... continues to move into quadrant 26, $H_1$ as ... or 52, and as shown in FIG. 3(*b*), ... es to assist film or a current change ... have a frequency that is twice the ...

Figure 4:
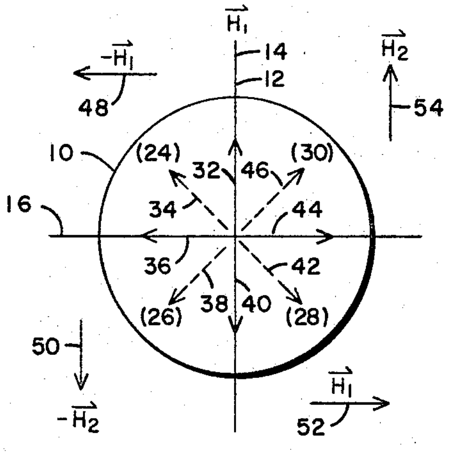
FIG. 4 discloses how the phase angle between the input and output signals may be varied.
Figure 5:
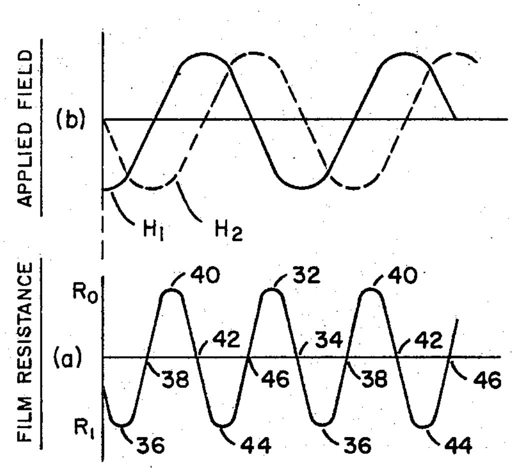
FIG. 5 shows the corresponding change in film resistance caused by the application of the external orthogonal fields shown in FIG. 4.

FIG. 4 shows how the phase angle betwe[en] ... and output frequencies may be varied. In FIG. 4, ... sense line 12 has been moved 45° until it coincides with drive line 14. Under steady-state conditions, assume that the film magnetization vector 18 is in the position shown by vector 32. The film resistance will be a maximum at this time because the magnetization vector is parallel to the sense line 12. Assume that $$\vec{H}_1$$

is now maximum in the negative direction and towar[d] zero. As the magnetization vector 18 moves into quadra[nt] 24, the resistance of the film decreases. It is a med[ian] value when the vector 18 is in the position shown [by] vector 34. Also see point 34 in FIG. 5(*a*). The ve[ctor] 18 continues to rotate under the influence of ext[ernal] fields $$\vec{H}_1$$

and $$\vec{H}_2$$

as described earlier. Note again in FIG. 5(*a*) that vector 18 lags the applied magnetic fie[lds] ... 3(*b*) and 5(*b*) show the same plot of $$\vec{H}_1$$

and $$\vec{H}_2$$

However, the plot of the film resistance s[hown in] 5(*a*) indicates that a phase shift of 90° has occurred. Thus, to obtain a phase an[gle] ... input and output frequencies either the ... drive lines or the position of the sense li[ne] ... with respect to each other.

Figure 6:
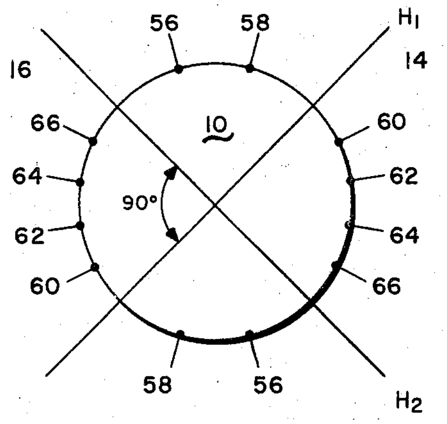
FIG. 6 shows a planar thin film element having a plurality of sense lines connected at a plurality of angular positions with respect to the drive lines.

FIG. 6 shows a film with a multip[le] ... contacts 56–66 any of which may b[e] ... output phase angle as desired. Slidin[g] ... as in a wire-wound potentiometer wi[ll] ... phase adjustment.

Figure 7:
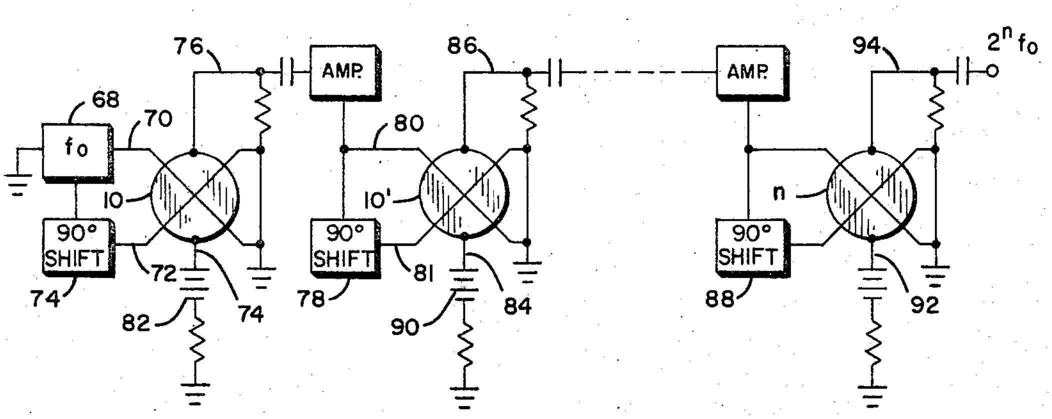
FIG. 7 shows apparatus for developing a frequency $2^n$ times that of the original frequency.

A frequency of $2^n$ of the origi[nal] ... obtained by using $n$ of the doubling ... Such a system is shown in FIG. 7 ... of frequency $f_0$ is passed throug[h] ... which are inductively associate[d] ... phase in leg 72 is shifted 90° ... in leg 70 by phase shifter 74. ... lines 74 and 76 is a voltage ... quency of $2f_0$. Source 82 pro[duces] ... which varies as the film res[istance] ... D.C. is applied to drive li[nes] ... Phase shifting network 78 s[hifts] ... with respect to the phase ... 10′ on lines 84 and 86 i[s] ... is repeated for $n$ stages w[ith] ... on lines 92 and 94 is $2^n f_0$ ...

It is understood that ... made in the structure a[nd] ... cations come within th[e] ... claims. Having now, ... scribed our inventio[n] ... desire to protect by [Letters Patent] ...

1. A distortion fr[ee] ... an isotropic magn[etic] ... netic vector, ...

first means con[n] ... ting said

...line in inductive relation with ...line, and

...rrent of frequency $f_0$ applied to said first drive line, and a second current shifted 90° from frequency $f_0$ applied to said second drive line.

3. A frequency doubler as in claim 2 wherein said detecting means comprises:

sense line means connected to said element, and a current source and a load connected in said sense line in series with said element, said doubled frequency caused by said rotating remanent vector developing a voltage change across said load.

4. A distortion free frequency doubler comprising:

a planar isotropic magnetic element having a remanent magnetization vector,

...rst means connected to said element for continuously rotating said vector with a frequency $f_0$, ...cond means connected to said element for detecting ...n output frequency $2f_0$ developed by said rotating ...ector, and ... means connected to said element for shifting the ...ase of said output frequency with respect to said ...ut frequency.

... frequency doubler as in claim 4 wherein said ...eans comprises:

...ity of sense line means connected to said planar ...nt at various angular positions with respect to ...ive lines.

...uency doubler as in claim 5 wherein said ...ns comprises:

...ctrical contact means in electrical engage- said plurality of sense line means to pro- ...tinuously variable phase adjustment.

...cy generator comprising:

...agnetic elements each having a remanent ...n vector,

...nnected to each of said elements, a pair of drive lines oriented at an angle of 90° to each other and inductively coupled to each of said elements for rotating said remanent vector, means for connecting said elements in serial arrangement by connecting the sense line of each element except the last in the series to the drive lines of the following element, means for connecting a first current source in series with one of said drive lines coupled to each element, said current source connected to the drive line of the first of said elements in said series producing a frequency $f_0$, means for connecting a 90° phase shift network in series with the other of said drive lines coupled to each element, and a second current source means and a load means connected in series with said sense line of said last element across which an output voltage of frequency $2^n f_0$ caused by said rotating vectors may be developed.

References Cited

UNITED STATES PATENTS 3,051,891 8/1962 Jorgensen ---------- 323—76

OTHER REFERENCES

"Isotropic Permalloy Films" by Fuchs and Zinn, Journal of Applied Physics; Vol. 34, No. 9, September 1963; pp. 2557–2562.

"Isotropic Thin Film Memory Device" by J. E. Eggenberger, IBM Technical Disclosure Bulletin, Vol. 2, No. 1, June 1959.

JOHN F. COUCH, *Primary Examiner.*

G. GOLDBERG, *Assistant Examiner.*